US011049001B2

(12) United States Patent
Alvarez-Icaza Rivera et al.

(10) Patent No.: US 11,049,001 B2
(45) Date of Patent: *Jun. 29, 2021

(54) EVENT-BASED NEURAL NETWORK WITH HIERARCHICAL ADDRESSING FOR ROUTING EVENT PACKETS BETWEEN CORE CIRCUITS OF THE NEURAL NETWORK

(71) Applicant: International Business Machines Corporation, Armonk, NY (US)

(72) Inventors: Rodrigo Alvarez-Icaza Rivera, San Jose, CA (US); John V. Arthur, Mountain View, CA (US); Andrew S. Cassidy, Austin, TX (US); Bryan L. Jackson, Fremont, CA (US); Paul A. Merolla, Palo Alto, CA (US); Dharmendra S. Modha, San Jose, CA (US); Jun Sawada, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 258 days.

This patent is subject to a terminal disclaimer.

(21) Appl. No.: 16/049,539

(22) Filed: Jul. 30, 2018

(65) Prior Publication Data

US 2021/0166107 A1    Jun. 3, 2021

Related U.S. Application Data

(63) Continuation of application No. 14/229,756, filed on Mar. 28, 2014, now Pat. No. 10,102,474.

(51) Int. Cl.
*G06N 3/063*    (2006.01)

(52) U.S. Cl.
CPC .................................. *G06N 3/063* (2013.01)

(58) Field of Classification Search
None
See application file for complete search history.

(56) References Cited

U.S. PATENT DOCUMENTS

2005/0055196 A1    5/2005    Cohen et al.
2012/0109863 A1    5/2012    Esser et al.
(Continued)

OTHER PUBLICATIONS

Davies, S. et al. (2012, June). "Population-Based Routing in the SpiNNaker Neuromorphic Architecture". WCCI 2012 IEEE World Congress on Computational Intelligence. 8 pages. (Year: 2012).*
(Continued)

*Primary Examiner* — Kamran Afshar
*Assistant Examiner* — Benjamin J Buss
(74) *Attorney, Agent, or Firm* — Sherman IP LLP; Kenneth L. Sherman; Hemavathy Perumal

(57) ABSTRACT

The present invention provides a system comprising multiple core circuits. Each core circuit comprises multiple electronic axons for receiving event packets, multiple electronic neurons for generating event packets, and a fanout crossbar including multiple electronic synapse devices for interconnecting the neurons with the axons. The system further comprises a routing system for routing event packets between the core circuits. The routing system virtually connects each neuron with one or more programmable target axons for the neuron by routing each event packet generated by the neuron to the target axons. Each target axon for each neuron of each core circuit is an axon located on the same core circuit as, or a different core circuit than, the neuron.

15 Claims, 7 Drawing Sheets

(56) References Cited

U.S. PATENT DOCUMENTS

| | | |
|---|---|---|
| 2012/0109866 A1 | 5/2012 | Modha |
| 2013/0031040 A1 | 1/2013 | Modha |
| 2013/0073497 A1* | 3/2013 | Akopyan ............... G06N 3/049 706/27 |
| 2014/0032464 A1 | 1/2014 | Esser et al. |
| 2014/0032465 A1 | 1/2014 | Modha |
| 2015/0302295 A1 | 10/2015 | Rivera et al. |

OTHER PUBLICATIONS

Yakopcic, C. et al. (Jun. 2014). "Tolerance to defective memristors in a neuromorphic learning circuit." NAECON 2014—IEEE National Aerospace and Electronics Conference. IEEE, 2014. pp. 243-249. DOI:10.1109/NAECON.2014.7045810 (Year: 2014).*

Cruz-Albrecht, J.M. (2013). "A scalable neural chip with synaptic electronics using CMOS integrated memristors". Nanotechnology 24 (2013) 384011 (11pp). doi:10.1088/0957-4484/24/38/384011 (Year: 2013).*

Rast, A.D. et al., "Virtual Synaptic Interconnect Using an Asynchronous Network-on-Chip", International Joint on Neural Networks (IJCNN 2008), 2008, pp. 2727-2734, IEEE, United States Conference.

Minkovich, K. et al., "Programming time-multiplexed reconfigurable hardware using a scalable neuromorphic compiler", IEEE transactions on neural networks and learning systems, Jun. 2012, pp. 889-901, 23(6), IEEE DOI: 10.11 09/TNNLS.2012.2191795, United States.

Carrillo, S. et al. "Scalable hierarchical network-on-chip architecture for spiking neural network hardware implementations", IEEE Transactions on Parallel and Distributed Systems, Dec. 2013, pp. 2451-2461, vol. 24, No. 12, IEEE DOI: 10.11 09/TPDS.2012.289, United States.

Joshi, S. et al., "Scalable Event Routing in Hierarchical Neural Array Architecture with Global Synaptic Connectivity", In the Proceedings of the 2010 12th International Workshop on Cellular Nanoscale Networks and their Applications (CNNA), 2010, pp. 1-6, IEEE Xplore, United States.

Mehrtash, N. et al., "Synaptic Plasticity in Spiking Neural Networks (SP2INN): A System Approach", In the Proceedings of the 2003 IEEE Transactions on Neural Networks, Sep. 2003, pp. 980-992, vol. 14, No. 5, IEEE, United States.

Pande, S. et al., "Addressing the Hardware Resource Requirements of Network-on-Chip based Neural Architectures", In the Proceedings of the 2011 International Conference on Neural Theory and Applications, 2011, SciTePress, pp. 128-137, France.

U.S. Non-Final Office Action for U.S. Appl. No. 14/229,756 dated Apr. 19, 2017.

U.S. Non-Final Office Action for U.S. Appl. No. 14/229,756 dated Jan. 12, 2018.

U.S. Final Office Action for U.S. Appl. No. 14/229,756 dated Oct. 19, 2017.

U.S. Advisory Action for U.S. Appl. No. 14/229,756 dated Nov. 30, 2017.

U.S. Notice of Allowance for U.S. Appl. No. 14/229,756 dated Jun. 5, 2018.

U.S. Corrected Notice of Allowability for U.S. Appl. No. 14/229,756 dated Jun. 22, 2018.

* cited by examiner

_EVENT-BASED NEURAL NETWORK WITH HIERARCHICAL ADDRESSING FOR ROUTING EVENT PACKETS BETWEEN CORE CIRCUITS OF THE NEURAL NETWORK_

This invention was made with Government support under HR0011-09-C-0002 awarded by Defense Advanced Research Projects Agency (DARPA). The Government has certain rights in this invention.

BACKGROUND

The present invention relates to neuromorphic and synaptronic computation, and in particular, an event-based neural network with hierarchical addressing.

Neuromorphic and synaptronic computation, also referred to as artificial neural networks, are computational systems that permit electronic systems to essentially function in a manner analogous to that of biological brains. In traditional von Neumann architectures, memory and computation are separated. By comparison, embodiments of the invention utilize biologically inspired architecture where threshold based computation is integrated with memory. In neuromorphic and synaptronic computation, connections are created between processing elements that are roughly functionally equivalent to neurons of a biological brain. Neuromorphic and synaptronic computation may comprise various electronic circuits that are modeled on biological neurons.

In biological systems, the point of contact between an axon of a neural module and a dendrite on another neuron is called a synapse, and with respect to the synapse, the two neurons are respectively called pre-synaptic and post-synaptic. The essence of our individual experiences is stored in conductance of the synapses.

BRIEF SUMMARY

One embodiment provides a system comprising multiple core circuits. Each core circuit comprises multiple electronic axons for receiving event packets, multiple electronic neurons for generating event packets, and a fanout crossbar including multiple electronic synapse devices for interconnecting the neurons with the axons. The system further comprises a routing system for routing event packets between the core circuits. The routing system virtually connects each neuron with one or more programmable target axons for the neuron by routing each event packet generated by the neuron to the target axons. Each target axon for each neuron of each core circuit is an axon located on the same core circuit as, or a different core circuit than, the neuron.

Another embodiment provides a method for hardware implementation of a neural network comprising a plurality of neuron groups for generating event packets and a plurality of electronic axons for receiving event packets. Each neuron group has multiple electronic neurons, and each neuron has a plurality of connections for inter-neuron communication. The method comprises physically connecting each neuron group with one or more axons via a fanout crossbar comprising one or more electronic synapse devices. The method further comprises virtually connecting each neuron with one or more programmable target axons for the neuron by routing each event packet generated by the neuron to the target axons. Each target axon for each neuron of each core circuit is an axon located on the same core circuit as, or a different core circuit than, the neuron.

These and other features, aspects and advantages of the present invention will become understood with reference to the following description, appended claims and accompanying figures.

DETAILED DESCRIPTION

Figure 1:
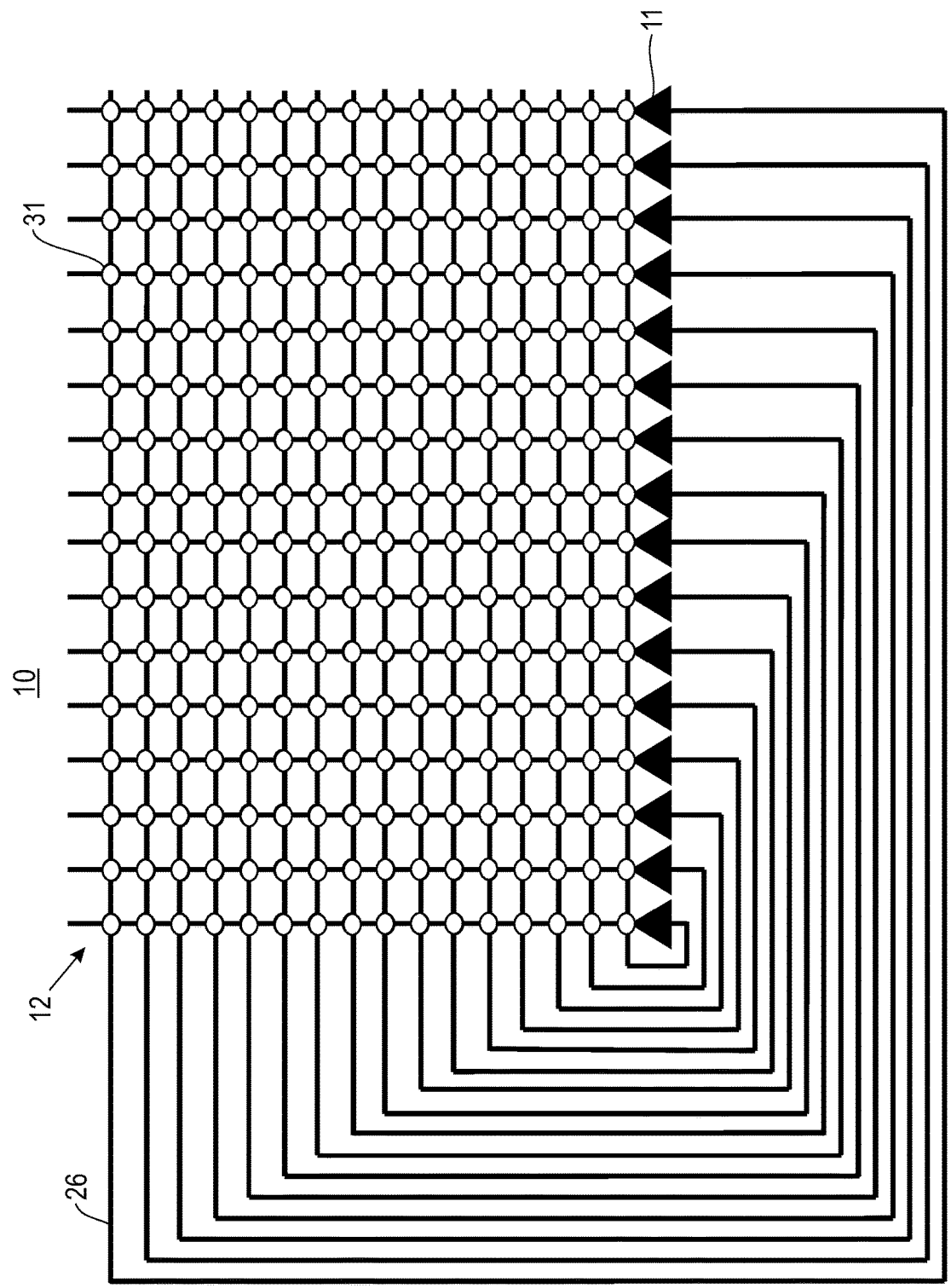
FIG. 1 illustrates an example all-to-all neural network system ("all-to-all network"), in accordance with an embodiment of the invention.

Embodiments of the invention relate to neuromorphic and synaptronic computation, and in particular, an event-based neural network with hierarchical addressing. The neural network comprises multiple core circuits. Each core circuit includes electronic axons for receiving event packets, electronic neurons for generating event packets, and a fanout crossbar including electronic synapse devices that physically connect the neurons to the axons. A routing system routes event packets between the core circuits. The routing system virtually connects each neuron with an axon located on the same core circuit as, or a different core circuit than, the neuron by routing each event packet generated by the neuron to the axon.

The term electronic neuron as used herein represents an architecture configured to simulate a biological neuron. An electronic neuron creates connections between processing elements that are roughly functionally equivalent to neurons of a biological brain. As such, a neuromorphic and synaptronic computation comprising electronic neurons, according to embodiments of the invention, may include various electronic circuits that are modeled on biological neurons. Further, a neuromorphic and synaptronic computation comprising electronic neurons, according to embodiments of the invention, may include various processing elements (including computer simulations) that are modeled on biological neurons. Although certain illustrative embodiments of the invention are described herein using electronic neurons comprising electronic circuits, the present invention is not limited to electronic circuits. A neuromorphic and synaptronic computation, according to embodiments of the invention, can be implemented as a neuromorphic and synaptronic architecture comprising circuitry, and additionally as a computer simulation. Indeed, embodiments of the invention can take the form of an entirely hardware embodiment, an entirely software embodiment, or an embodiment containing both hardware and software elements.

The term electronic axon as used herein represents an architecture configured to simulate a biological axon that transmits information from one biological neuron to different biological neurons. In one embodiment, an electronic axon comprises a circuit architecture. An electronic axon is functionally equivalent to axons of a biological brain. As such, neuromorphic and synaptronic computation involving electronic axons according to embodiments of the invention may include various electronic circuits that are modeled on biological axons. Although certain illustrative embodiments of the invention are described herein using electronic axons comprising electronic circuits, the present invention is not limited to electronic circuits.

In one embodiment, a neuromorphic system comprises a system that implements neuron models, synaptic models, neural algorithms, and/or synaptic algorithms. In one embodiment, a neuromorphic system comprises software components and/or hardware components, such as digital hardware, analog hardware or a combination of analog and digital hardware (i.e., mixed-mode).

FIG. 1 illustrates an example all-to-all neural network system ("all-to-all network") 10, in accordance with an embodiment of the invention. The all-to-all network 10 comprises a plurality of electronic neurons 11. Let N generally denote the number of neurons 11 in the all-to-all network 10, wherein N is a positive integer. As shown in FIG. 1, each neuron 11 is connected with all neurons 11 of the all-to-all network 10.

Specifically, the neurons 11 are interconnected via an N×N fanout crossbar 12 comprising multiple electronic synapse devices ("synapses") 31 and multiple electronic axons 26, wherein "x" represents multiplication. Let S generally denote the number of synapses 31 in the all-to-all network 10, wherein S is a positive integer, and wherein S is N×N. As shown in FIG. 1, each synapse 31 is located at cross-point junction between an axon 26 and a neuron 11, such that a synaptic connection between the axon 26 and the neuron 11 is made through the synapse 31. Each synapse 31 communicates neuronal firing events (e.g., spike events) between an axon 26 and a neuron 11. Therefore, each synapse 31 interconnects an axon 26 to a neuron 11, wherein, with respect to the synapse 31, the axon 26 and the neuron 11 represent an axon of a pre-synaptic neuron and a dendrite of a post-synaptic neuron, respectively.

A neuron 11 receives incoming neuronal firing events via connected synapses 31, and, in response to the incoming neuronal firing events received, generates an outgoing neuronal firing event according to a neuronal activation function. A preferred embodiment for the neuronal activation function can be leaky integrate-and-fire. An axon 26 directly connected to the neuron 11 propagates the outgoing neuronal firing event to one or more neurons 11 via synapses 31 of the connected axon 26. The all-to-all network 10 therefore allows for a neuron 11 to target multiple synapses 31 simultaneously.

In one embodiment, each synapse 31 and each neuron 11 has configurable operational parameters.

In one embodiment, an external two-way communication environment may supply sensory inputs and consume motor outputs. For example, some axons 26 may be driven externally by sensory inputs supplied by the external two-way communication environment, and some neurons 11 may provide motor outputs to the external two-way communication environment.

In one embodiment, the neurons 11 are implemented using complementary metal-oxide semiconductor (CMOS) logic gates that receive neuronal firing events and generate a neuronal firing event according to the neuronal activation function. In one embodiment, the neurons 11 include comparator circuits that generate neuronal firing events according to the neuronal activation function.

In one embodiment, the synapses 31 are implemented using 1-bit static random-access memory (SRAM) cells. In one embodiment, each synapse 31 is set to either an "on" position or an "off" position. For example, an unused synapse 31 is set to the "off" position by setting a corresponding 1-bit of the synapse 31 to '0'.

In one embodiment, a dense neural network may be implemented using the all-to-all network 10. A dense neural network maps efficiently to the all-to-all network 10 as most synapses 31 of the all-to-all network 10 are used (i.e., most of the synapses 31 are set to the "on" position).

In one embodiment, a sparse neural network may be implemented using the all-to-all network 10. A sparse neural network, however, maps inefficiently to the all-to-all network 10 as most of the synapses 31 of the all-to-all network 10 are unused (i.e., most of the synapses 31 are set to the "off" position).

In one embodiment, soft-wiring in the core circuit 10 is implemented using address events which are non-deterministic (e.g., Address-Event Representation (AER)).

Although certain illustrative embodiments of the invention are described herein using synapses 31 comprising electronic circuits, the present invention is not limited to electronic circuits.

Figure 2:
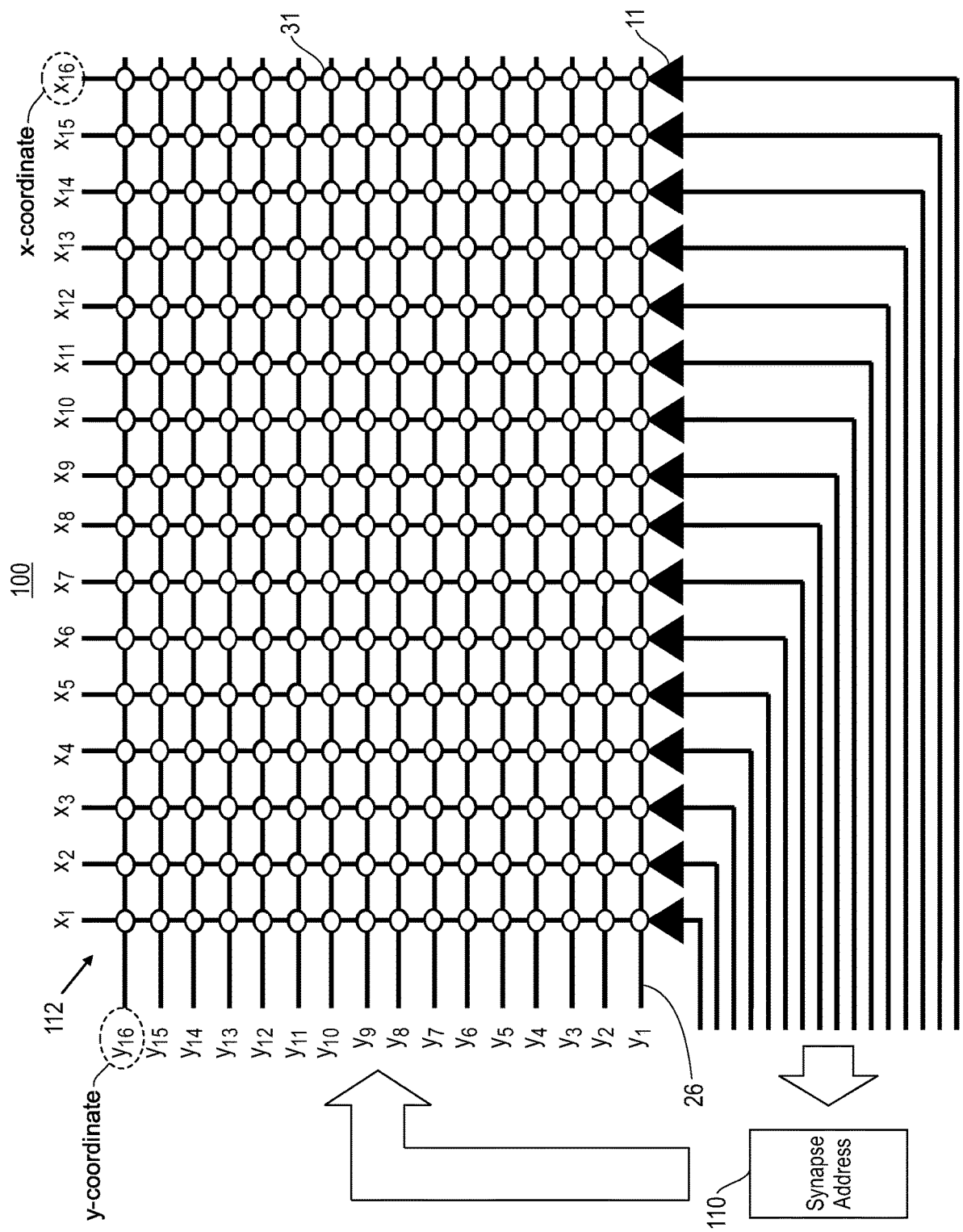
FIG. 2 illustrates an example point-to-point neural network ("point-to-point network"), in accordance with an embodiment of the invention.

FIG. 2 illustrates an example point-to-point neural network ("point-to-point network") 100, in accordance with an embodiment of the invention. The point-to-point network 100 comprises a plurality of electronic neurons 11 and a plurality of electronic axons 26. The neurons 11 and the axons 26 are interconnected via a crossbar 112 comprising multiple electronic synapse devices ("synapses") 31.

Unlike the all-to-all network 10 that allows for a neuron 11 to target multiple synapses 31 simultaneously, a neuron 11 in the point-to-point network 100 can only target one synapse 31 of the crossbar 112 at a time. Each synapse 31 has a corresponding synapse address. Let $x_i$, $y_j$ denote a synapse address for a synapse 31 located at x-coordinate $x_i$ and y-coordinate $y_j$ of the crossbar 112. For example, $x_1$, $y_{16}$ represents a synapse address for a synapse 31 located at x-coordinate $x_i$ and y-coordinate $y_{16}$ of the crossbar 112.

The point-to-point network 100 further comprises at least one look-up table (LUT) 110. Specifically, each neuron 11 has a corresponding LUT 110 maintaining one or more synapse addresses for target synapses 31 of the neuron 11.

A neuron 11 receives incoming neuronal firing events via connected synapses 31, and, in response to the incoming neuronal firing events received, generates an outgoing neuronal firing event according to a neuronal activation function. A preferred embodiment for the neuronal activation function can be leaky integrate-and-fire. Synapse addresses for target synapses 31 of the neuron 11 are obtained from a corresponding LUT 110 for the neuron 11. For each target synapse 31, the neuron 11 sends out an event packet with a synapse address for the target synapse 31, wherein the event packet corresponds to the outgoing neuronal firing event, and wherein the event packet is routed to the synapse address for the target synapse 31. The event packets are sequentially delivered to the target synapses 31.

Let S generally denote the number of synapses 31 in the point-to-point network 100, wherein S is a positive integer.

In one embodiment, an LUT 110 maintains $S*\log_2 S$ bits of data representing synapse addresses. Therefore, unlike the all-to-all network 10, each synaptic connection in the point-to-point network 100 requires more than 1-bit of data.

In one embodiment, a dense neural network may be implemented using the point-to-point network 100. A dense neural network, however, maps inefficiently to the point-to-point network 100 as a larger amount of memory is required to implement a LUT 110.

In one embodiment, a sparse neural network may be implemented using the point-to-point network 100. A sparse neural network maps efficiently to the point-to-point network 100 as a smaller amount of memory is required to implement a LUT 110.

Figure 3:
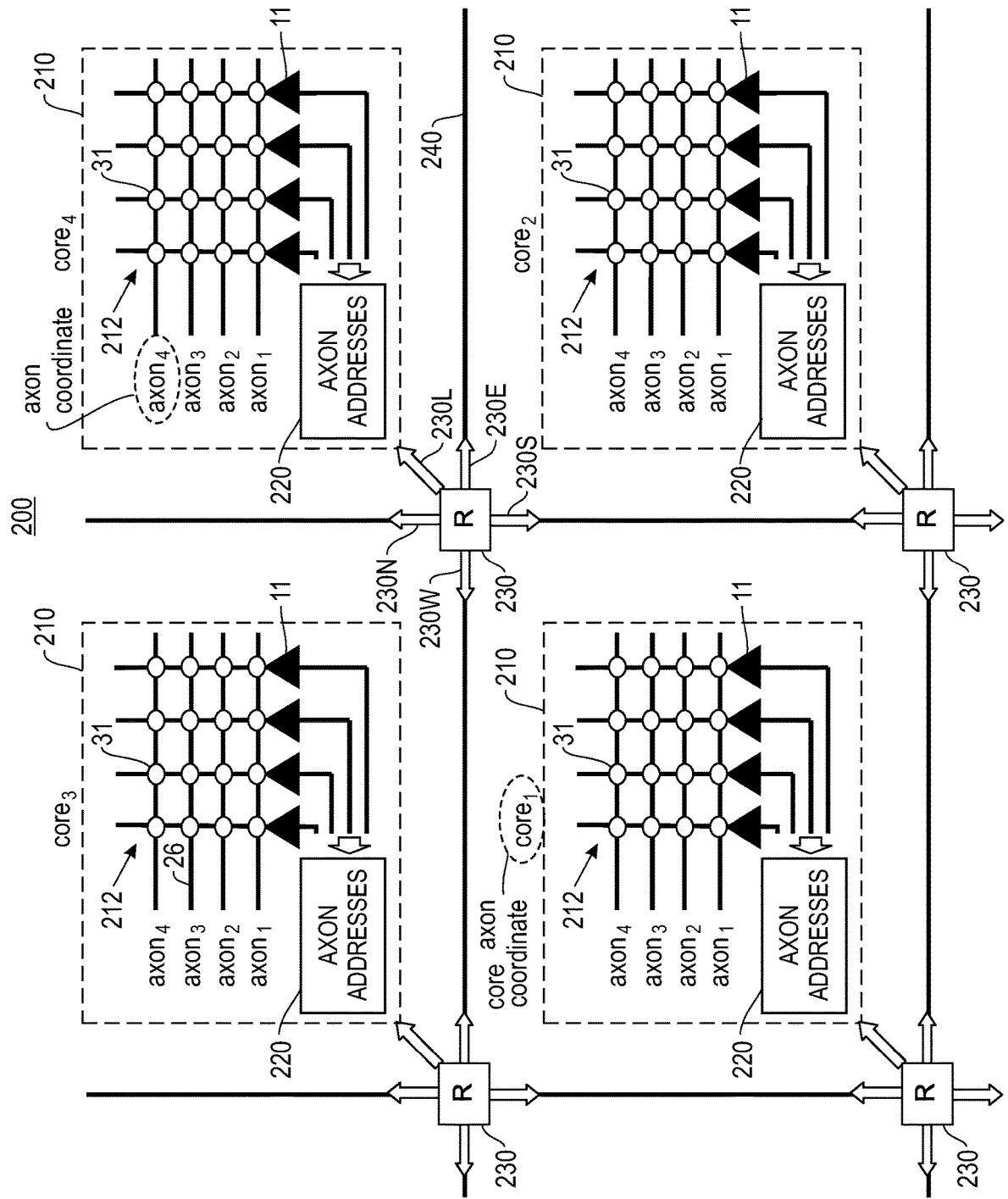
FIG. 3 illustrates an example event-based neural network with hierarchical addressing, in accordance with an embodiment of the invention.

FIG. 3 illustrates an example event-based neural network 200 with hierarchical addressing, in accordance with an embodiment of the invention. The neural network 200 comprises multiple core circuits 210. Each core circuit 210 comprises multiple electronic neurons 11, multiple electronic axons 26, and a programmable fanout crossbar 212 including multiple electronic synapse devices 31 physically connecting the neurons 11 with the axons 26.

Let N generally denote the total number of neurons 11 in the neural network 200, wherein N is a positive integer. As shown in FIG. 3, the neurons 11 of the neural network 200 are divided between the core circuits 210. Let C denote the number of neurons 11 in each core circuit 210, wherein C is a positive integer. Each core circuit 210 has the same number of neurons 11. Let A denote the number of axons 26 in each core circuit 210, wherein A is a positive integer. Let $S_{crossbar}$ denote the number of synapses 31 in each fanout crossbar 212, wherein $S_{crossbar}$ is $C*A$.

Therefore, the neural network 200 comprises N/C core circuits 210, wherein each core circuit 210 comprises a fanout crossbar 212. Let S generally denote the total number of synapses 31 in the neural network 200, wherein S is a positive integer equal to $N*A$ or $(N/C)*S_{crossbar}$.

In one embodiment, each core circuit 210 has a corresponding core coordinate, and each axon 26 of the core circuit 210 has a corresponding axon coordinate.

The neural network 200 further comprises multiple packet routers 230 for communicating event packets corresponding to neuronal firing events between the core circuits 210. Specifically, each core circuit 210 has a corresponding packet router 230. The packet routers 230 are interconnected via multiple data paths (e.g., signal lines) 240. In one embodiment, each core circuit 210 receives event packets from other core circuits 210 via a corresponding packet router 230, and sends event packets to other core circuits 210 via the corresponding packet router 230. Each core circuit 210 utilizes a corresponding packet router 230 to pass along event packets in the eastbound, westbound, northbound, or southbound direction. The packet routers 230 facilitate the propagation of neuronal firing events to target axons 26.

Specifically, each packet router 230 comprises a local channel 230L for receiving event packets generated by neurons 11 of a corresponding core circuit 210, and sending event packets targeting axons 26 of the corresponding core circuit 210. Each packet router 230 further comprises a northbound channel 230N, a southbound channel 230S, an eastbound channel 230E, and a westbound channel 230W for passing along event packets to neighboring packet routers 230 in the northbound, southbound, eastbound, and westbound directions, respectively.

A packet router 230 may be interconnected with up to four different packet routers 230. The northbound channel 230N of the packet router 230 interconnects the packet router 230 with an adjacent neighboring packet router 230 to the north of the packet router 230 ("north neighboring packet router"). The packet router 230 receives packets from the north neighboring packet router 230 via the northbound channel 230N, and sends packets to the north neighboring packet router 230 via the northbound channel 230N. The southbound channel 230S of the packet router 230 interconnects the packet router 230 with an adjacent neighboring packet router 230 to the south of the packet router 230 ("south neighboring packet router"). The packet router 230 receives packets from the south neighboring packet router 230 via the southbound channel 230S, and sends packets to the south neighboring packet router 230 via the southbound channel 230S. The eastbound channel 230E of the packet router 230 interconnects the packet router 230 with an adjacent neighboring packet router 230 to the east of the packet router 230 ("east neighboring packet router"). The packet router 230 receives packets from the east neighboring packet router 230 via the eastbound channel 230E, and sends packets to the east neighboring packet router 230 via the eastbound channel 230E. The westbound channel 230W of the packet router 230 interconnects the packet router 230 with an adjacent neighboring packet router 230 to the west of the packet router 230 ("west neighboring packet router"). The packet router 230 receives packets from the west neighboring packet router 230 via the westbound channel 230W, and sends packets to the west neighboring packet router 230 via the westbound channel 230W.

For example, a southbound channel 230S and an eastbound channel 230E of a packet router 230 for the core circuit 210 with core coordinate $core_3$ may be interconnected to a northbound channel 230N of a packet router 230 for the core circuit 210 with core coordinate $core_1$ and a westbound channel 230W of a packet router 230 for the core circuit 210 with core coordinate $core_4$, respectively.

Each axon 26 in the neural network 200 has a corresponding axon address. As shown in FIG. 3, each core circuit 210 further comprises at least one look-up table (LUT) 220. Specifically, each neuron 11 of each core circuit 210 has a corresponding LUT 220 maintaining one or more axon addresses for target axons 26 of the neuron 11. Let $core_i$, $axon_j$ denote an axon address for an axon 26 located at axon coordinate $axon_j$ of a core circuit 210 with core coordinate $core_i$. For example, $core_3$, $axon_4$ represents an axon address for an axon 26 located at axon coordinate $axon_4$ of a core circuit 210 with core coordinate $core_3$.

Each neuron 11 is virtually connected to each target axon 26 of the neuron 11. In this specification, virtually connecting a neuron 11 with a target axon 26 represents routing each event packet generated by the neuron 11 to the target axon 26.

A neuron 11 of a core circuit 210 receives incoming neuronal firing events via connected synapses 31 and, in response to the incoming neuronal firing events received, generates an outgoing neuronal firing event according to a neuronal activation function. A preferred embodiment for the neuronal activation function can be leaky integrate-and-fire. Axon addresses for target axons 26 of the neuron 11 are obtained from a corresponding LUT 220 for the neuron 11. For each target axon 26, the neuron 11 sends out an event packet with an axon address for the target axon 26, wherein the event packet corresponds to the outgoing neuronal firing event, and wherein the event packet is routed to the axon address for the target axon 26. Specifically, each event packet targeting a target axon 26 is delivered to a core circuit 210 containing the target axon 26.

A neuron 11 in the neural network 200 can only send out one event packet to one core circuit 210 at a time. However, unlike the point-to-point network 10 that only allows for a neuron 11 to target one synapse 31 at a time, a neuron 11 in the neural network 200 may target up to C synapses 31 of a target axon 26 simultaneously (i.e., all synapses 31 of a target axon 26 are activated upon the target axon 26 receiving an event packet). Therefore, compared to the point-to-point network 10, event packet bandwidth in the neural network 200 may be reduced by up to a factor of C, thereby reducing both communication bandwidth and power requirements.

In one embodiment, each synaptic connection represented by each synapse 31 in the neural network 200 requires 1-bit of data.

In one embodiment, an LUT 220 maintains $N*\log_2(S/C)$ bits of data representing axon addresses. Therefore, a LUT 220 requires less memory than a LUT 110 of the point-to-point network 10.

In one embodiment, a dense neural network may be implemented using the neural network 200. A dense neural network maps efficiently to the neural network 200 as neurons 11 target clusters of synapses 31 in one or more core circuits 210.

In one embodiment, a sparse neural network may be implemented using the neural network 200. A sparse neural network maps efficiently to the neural network 200 as neurons 11 target clusters of synapses 31 in one or more core circuits 210.

Figure 4:
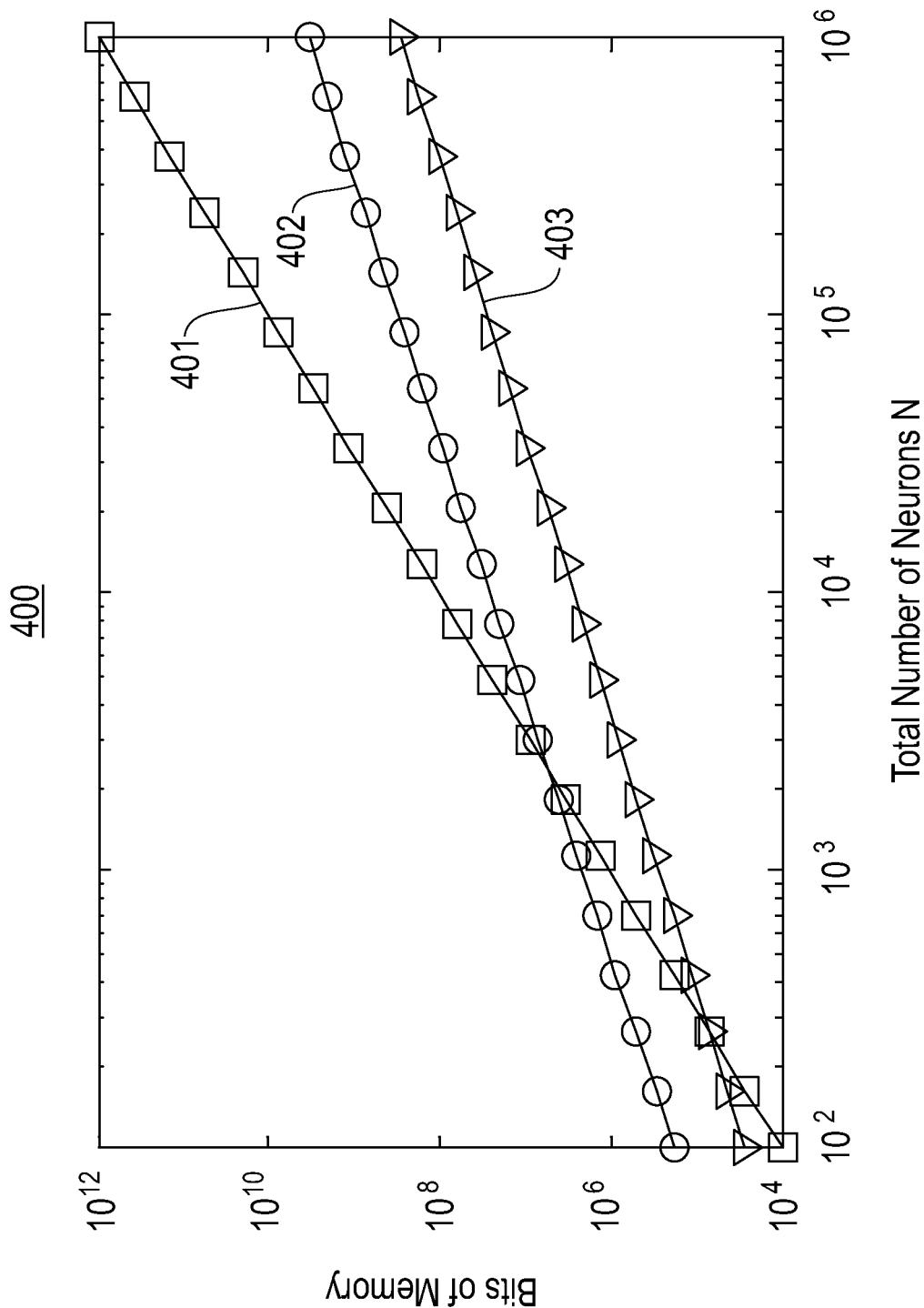
FIG. 4 illustrates memory requirements for different neural networks, in accordance with an embodiment of the invention.

FIG. 4 illustrates memory requirements for different neural networks, in accordance with an embodiment of the invention. Let N generally denote the total number of neurons 11 in a neural network. A first graph 401 illustrates the number of bits of memory required relative to the total number N of neurons 11 for an all-to-all network 10. A second graph 402 illustrates the number of bits of memory required relative to the total number N of neurons 11 for a point-to-point network 10. A third graph 403 illustrates the number of bits of memory required relative to the total number N of neurons 11 for an event-based neural network 200 with hierarchical addressing.

Let S generally denote the total number of synapses 31 in a neural network. Let s generally denote the number of synapses 31 per neuron 11 in a neural network.

The amount of memory required for the all-to-all network 10 is based on the size of the crossbar 12 of the all-to-all network 10. The total number of synapses 31 in the crossbar 12 is $N*s$. The total number of synapses 31 in the crossbar 12 may also be represented by $N*N$ (i.e., $N^2$) because each neuron 11 in the all-to-all network 10 is connected to all neurons 11 in the all-to-all network 10. Therefore, if each synapse 31 of the crossbar 12 only requires 1-bit of memory, the all-to-all network 10 requires at least $N^2$ bits of memory.

The amount of memory required for the point-to-point network 10 is based on a size of an LUT 110 of the point-to-point network 10. The total number of synapses 31 of the crossbar 112 of the point-to-point network 10 is $N*s$. The size of the LUT 110 is $S*\log_2 S$ or $N*s \cdot \log_2(N*s)$. Therefore, the point-to-point network 10 requires at least $N*s*\log_2(N*s)$ bits of memory.

The amount of memory required for the neural network 200 is based on the size of each core circuit 210 and a size of an LUT 220 of the neural network 200. Let A generally denote the number of axons 26 in each core circuit 210. Let C generally denote the number of neurons 11 in each core circuit 210. The total number of synapses 31 in the neural network 200 is $N*A$ or $N*C$. The size of the LUT 220 is $(S/C)*\log_2(S/C)$ or $N*\log_2 N$. Therefore, the neural network 200 requires at least $N*C+N*\log_2 N$ bits of memory.

In one embodiment, assume a neural fanout FO for a neuron 11 is 1. For example, each core circuit 210 of the neural network 200 has 256 neurons 11 and 256 axons 26 (i.e., C=256, and A=256). The neural network 200 utilizes only ½ the number of synapses 31 as the point-to-point network 10. As A/C=1 (i.e., the neural fanout FO is 1), each neuron 11 in the neural network 200 sends out one event packet per neuronal firing event generated by the neuron 11.

In another embodiment, assume the neural fanout FO is greater than 1. For example, each core circuit 210 of the neural network 200 has C neurons 11 and FO*C axons 26. Each neuron 11 in the neural network 200 sends out FO event packets per neuronal firing event generated by the neuron 11. If the neural fanout FO>1, the neural network 200 requires at least $N*FO*C+FO*N*\log_2(FO*N)$ bits of memory. However, even if the neural fanout FO is set to 10, the neural network 200 still uses the least amount of memory compared to the all-to-all network 10 and the point-to-point network 100 as the total number N of neurons 11 increases (e.g., when the total number N of neurons 11 is $10^6$).

Figure 5:
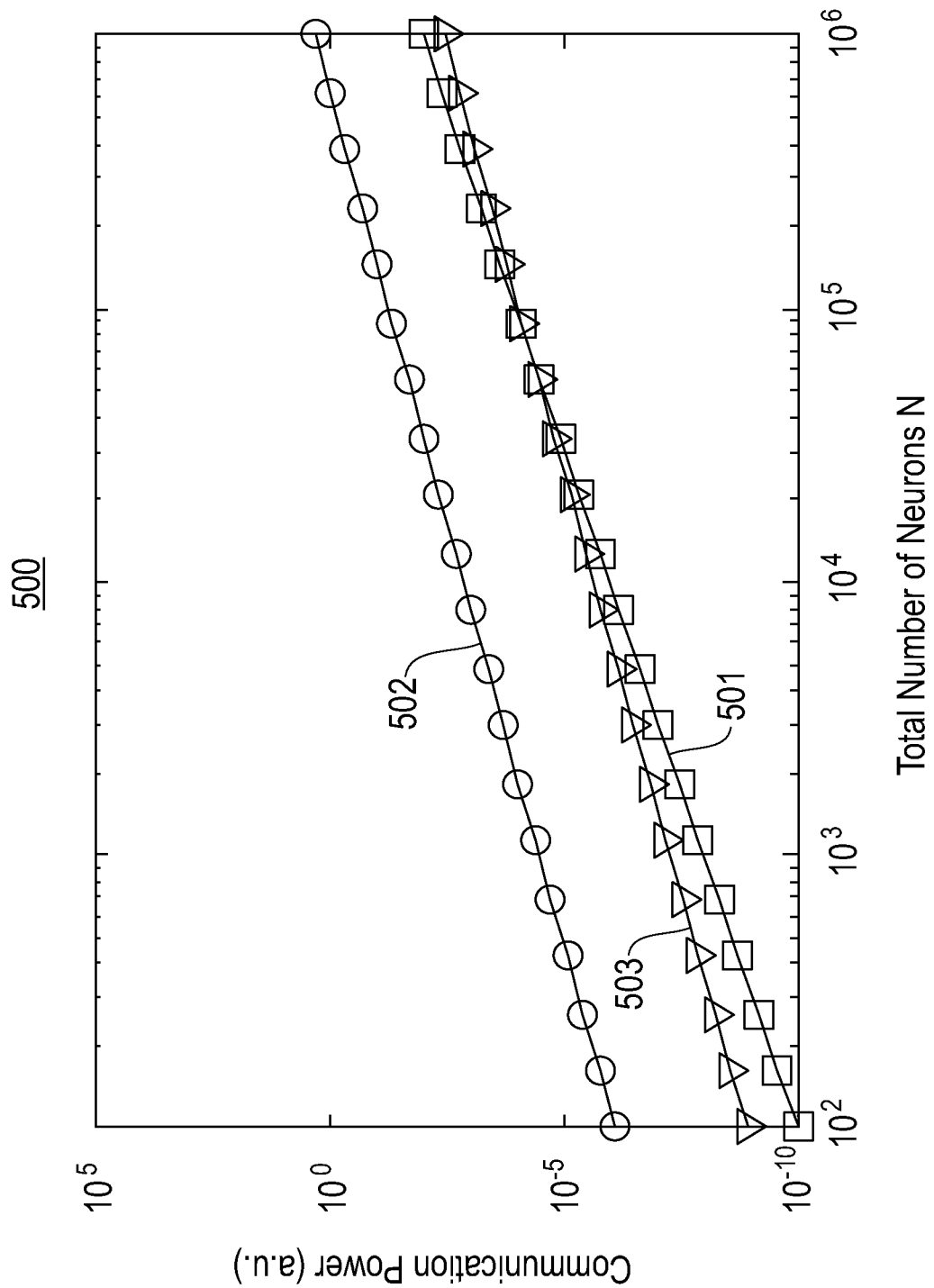
FIG. 5 illustrates communication bandwidth and power requirements for different neural networks, in accordance with an embodiment of the invention.

FIG. 5 illustrates communication bandwidth and power requirements for different neural networks, in accordance with an embodiment of the invention. Let N generally denote a total number of neurons 11 in a neural network. A first graph 501 illustrates the communication bandwidth and power requirements relative to the total number N of neurons 11 for an all-to-all network 10. A second graph 502 illustrates the communication bandwidth and power requirements relative to the total number N of neurons 11 for a point-to-point network 10. A third graph 503 illustrates the communication bandwidth and power requirements relative to the total number N of neurons 11 for an event-based neural network 200 with hierarchical addressing.

Let s generally denote the number of synapses 31 per neuron 11 in a neural network. Let f generally denote an average neuron frequency.

The amount of communication bandwidth required for the all-to-all network 10 is $f*N$. The normalized distance for the all-to-all network 10 is N. The amount of power required for the all-to-all network 10 is $\lambda*f*N^2$, wherein $\lambda$ represents a proportionality constant.

The amount of communication bandwidth required for the point-to-point network 10 is $f*N*s*\log_2(N*s)$. The normalized distance for the point-to-point network 10 is $(N*s*\log_2(N*s))^{1/2}$. The amount of power required for the point-to-point network 10 is $\lambda*f(N*s*\log_2(N*s))^{3/2}$.

The amount of communication bandwidth required for the neural network 200 is $f*N*\log_2 N$. The normalized distance for the neural network 200 is $(N*C+N*\log_2 N)^{1/2}$. The amount of power required for the point-to-point network 10 is $\lambda*f*N*\log_2 N*(N*C+N*\log_2 N)^{1/2}$.

Figure 6:
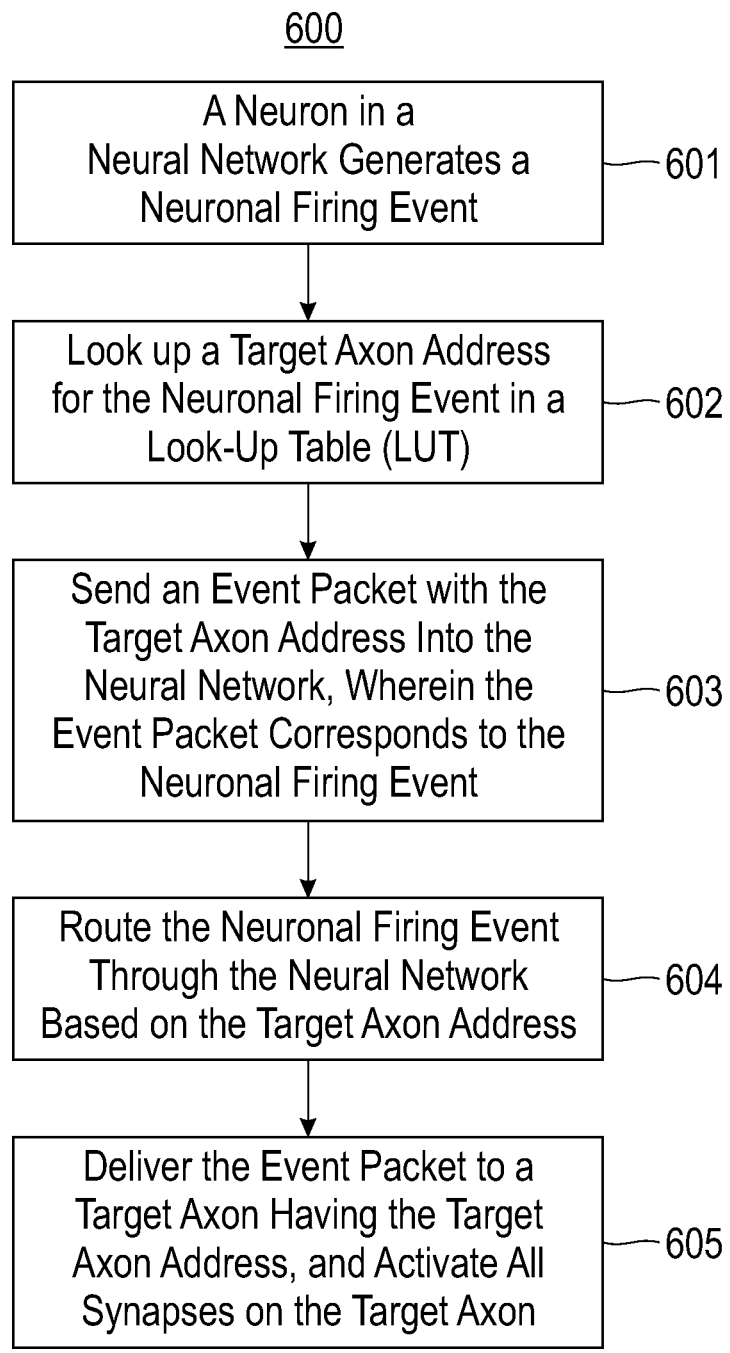
FIG. 6 illustrates a flowchart of an example process for communicating event packets in a neural network with hierarchical addressing, in accordance with an embodiment of the invention.

FIG. 6 illustrates a flowchart of an example process 600 for communicating event packets in a neural network with hierarchical addressing, in accordance with an embodiment of the invention. In process block 601, a neuron in a neural network generates a neuronal firing event (e.g., when the neuron spikes). In process block 602, look up a target axon address for the neuronal firing event in a look-up table (LUT). In process block 603, send an event packet with the target axon address into the neural network, wherein the event packet corresponds to the neuronal firing event. In process block 604, route the neuronal firing event through the neural network based on the target axon address. In process block 605, deliver the event packet to a target axon having the target axon address, and activate all synapses on the target axon.

Figure 7:
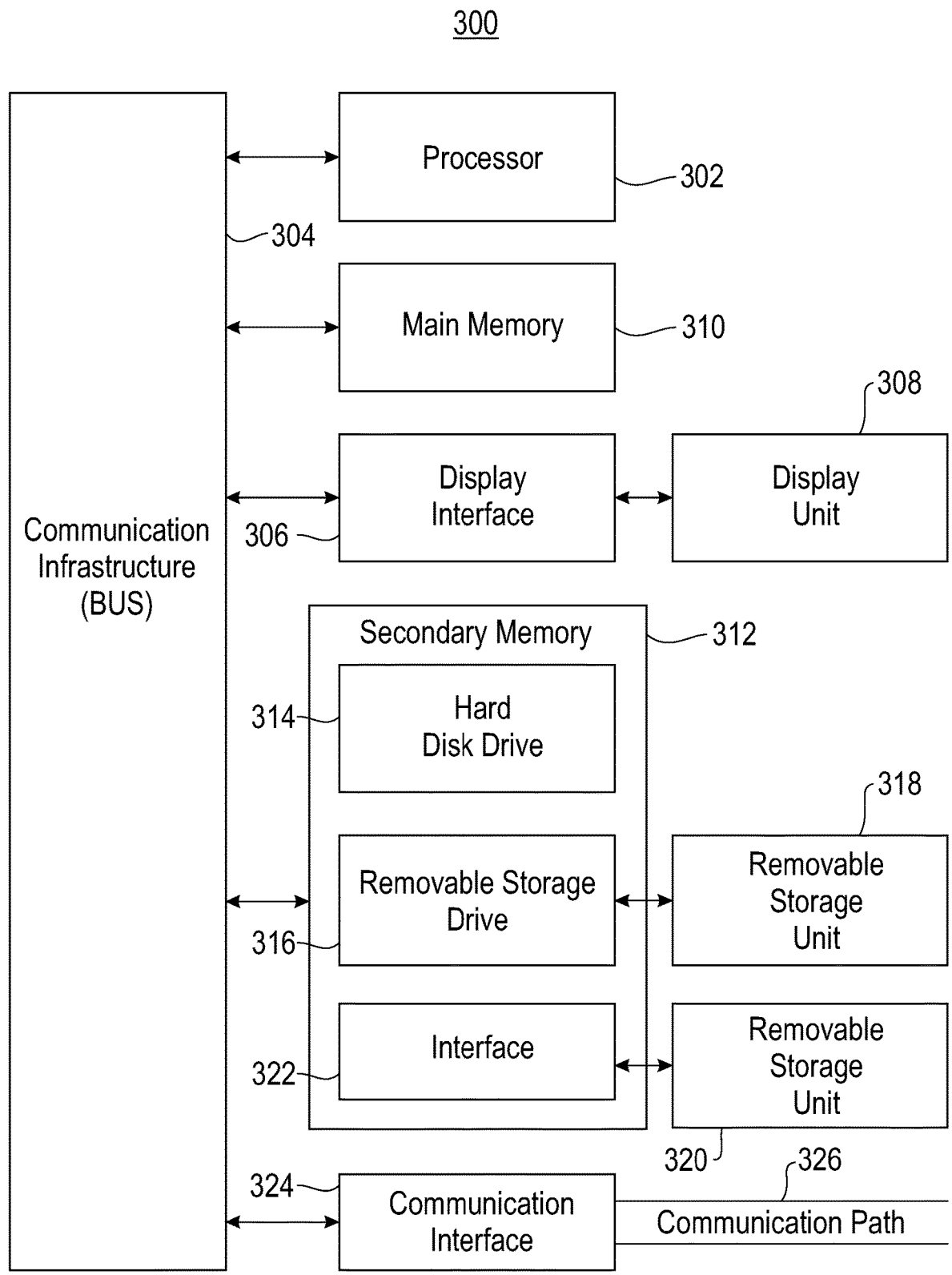
FIG. 7 illustrates a high-level block diagram showing an information processing system useful for implementing one embodiment of the present invention.

FIG. 7 is a high-level block diagram showing an information processing system 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. The present invention further provides a non-transitory computer-useable storage medium. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A neural network comprising:
a plurality of neurosynaptic core circuits, wherein each neurosynaptic core circuit comprises:
a plurality of electronic neurons;
a plurality of electronic axons; and
a plurality of electronic synapse devices interconnecting the electronic neurons with the electronic axons, wherein multiple electronic synapse devices connected to an electronic axon of the neurosynaptic core circuit are activated upon the electronic axon receiving a single incoming event packet from an electronic neuron of another neurosynaptic core circuit, wherein the electronic neuron targets the multiple electronic synapse devices simultaneously as the multiple electronic synapse devices are activated, and wherein bandwidth for events packets in the neural network is reduced by a factor equal to a total number of electronic neurons of the neurosynaptic core circuit when the electronic neuron targets the multiple electronic synapse devices simultaneously; and a plurality of packet routers interconnecting the neurosynaptic core circuits and routing event packets between the neurosynaptic core circuits, wherein each neurosynaptic core circuit has a corresponding packet router, the neurosynaptic core circuit receives one or more incoming event packets from one or more other neurosynaptic core circuits via the corresponding packet router, and the neurosynaptic core circuit sends one or more outgoing event packets to one or more other neurosynaptic core circuits via the corresponding packet router.

2. The neural network of claim 1, wherein the neural network is a dense neural network.

3. The neural network of claim 1, wherein the neural network is a sparse neural network.

4. The neural network of claim 1, wherein each neurosynaptic core circuit further comprises:
at least one look-up table (LUT) maintaining one or more addresses for one or more electronic axons targeted by one or more electronic neurons of the neurosynaptic core circuit.

5. The neural network of claim 4, wherein an amount of bits of memory maintained by the neural network is based on a size of each neurosynaptic core circuit and a size of each LUT.

6. A method comprising:
interconnecting a plurality of neurosynaptic core circuits via a plurality of packet routers to form a neural network; and
routing event packets between the neurosynaptic core circuits via the packet routers;
wherein each neurosynaptic core circuit comprises:
a plurality of electronic neurons;
a plurality of electronic axons; and
a plurality of electronic synapse devices interconnecting the electronic neurons with the electronic axons, wherein multiple electronic synapse devices connected to an electronic axon of the neurosynaptic core circuit are activated upon the electronic axon receiving a single incoming event packet from an electronic neuron of another neurosynaptic core circuit, wherein the electronic neuron targets the multiple electronic synapse devices simultaneously as the multiple electronic synapse devices are activated, and wherein bandwidth for events packets in the neural network is reduced by a factor equal to a total number of electronic neurons of the neurosynaptic core circuit when the electronic neuron targets the multiple electronic synapse devices simultaneously; and
wherein each neurosynaptic core circuit has a corresponding packet router, the neurosynaptic core circuit receives one or more incoming event packets from one or more other neurosynaptic core circuits via the corresponding packet router, and the neurosynaptic core circuit sends one or more outgoing event packets to one or more other neurosynaptic core circuits via the corresponding packet router.

7. The method of claim 6, wherein the neural network is a dense neural network.

8. The method of claim 6, wherein the neural network is a sparse neural network.

9. The method of claim 6, wherein each neurosynaptic core circuit further comprises:
at least one look-up table (LUT) maintaining one or more addresses for one or more electronic axons targeted by one or more electronic neurons of the neurosynaptic core circuit.

10. The method of claim 9, wherein an amount of bits of memory maintained by the neural network is based on a size of each neurosynaptic core circuit and a size of each LUT.

11. A computer program product comprising a non-transitory computer-useable storage medium having program code embodied therewith, the program code being executable by a computer to:
interconnect a plurality of neurosynaptic core circuits via a plurality of packet routers to form a neural network; and
route event packets between the neurosynaptic core circuits via the packet routers;
wherein each neurosynaptic core circuit comprises:
a plurality of electronic neurons;
a plurality of electronic axons; and
a plurality of electronic synapse devices interconnecting the electronic neurons with the electronic axons, wherein multiple electronic synapse devices connected to an electronic axon of the neurosynaptic core circuit are activated upon the electronic axon receiving a single incoming event packet from an electronic neuron of another neurosynaptic core circuit, wherein the electronic neuron targets the multiple electronic synapse devices simultaneously as the multiple electronic synapse devices are activated, and wherein bandwidth for events packets in the neural network is reduced by a factor equal to a total number of electronic neurons of the neurosynaptic core circuit when the electronic neuron targets the multiple electronic synapse devices simultaneously; and
wherein each neurosynaptic core circuit has a corresponding packet router, the neurosynaptic core circuit receives one or more incoming event packets from one or more other neurosynaptic core circuits via the corresponding packet router, and the neurosynaptic core circuit sends one or more outgoing event packets to one or more other neurosynaptic core circuits via the corresponding packet router.

12. The computer program product of claim 11, wherein the neural network is a dense neural network.

13. The computer program product of claim 11, wherein the neural network is a sparse neural network.

14. The computer program product of claim 11, wherein each neurosynaptic core circuit further comprises:
at least one look-up table (LUT) maintaining one or more addresses for one or more electronic axons targeted by one or more electronic neurons of the neurosynaptic core circuit.

15. The computer program product of claim 14, wherein an amount of bits of memory maintained by the neural network is based on a size of each neurosynaptic core circuit and a size of each LUT.

* * * * *